US008752688B2

(12) United States Patent
Fehrenbach

(10) Patent No.: US 8,752,688 B2
(45) Date of Patent: Jun. 17, 2014

(54) DEVICE FOR HANDLING VALUE NOTES

(75) Inventor: Christian Fehrenbach, Schonach (DE)

(73) Assignee: Wincor Nixdorf International GmbH (DE)

(*) Notice: Subject to any disclaimer, the term of this patent is extended or adjusted under 35 U.S.C. 154(b) by 88 days.

(21) Appl. No.: 13/504,882

(22) PCT Filed: Nov. 4, 2010

(86) PCT No.: PCT/EP2010/066815
§ 371 (c)(1),
(2), (4) Date: Jun. 5, 2012

(87) PCT Pub. No.: WO2011/054904
PCT Pub. Date: May 12, 2011

(65) Prior Publication Data
US 2013/0126311 A1 May 23, 2013

(30) Foreign Application Priority Data
Nov. 5, 2009 (DE) .................. 10 2009 052 040

(51) Int. Cl.
*B65H 27/00* (2006.01)
*B65H 29/58* (2006.01)
(52) U.S. Cl.
USPC .............. 193/37; 198/779; 138/165; 138/170
(58) Field of Classification Search
USPC ............. 193/37; 198/779; 138/156, 165, 166, 138/169, 170
See application file for complete search history.

(56) References Cited

U.S. PATENT DOCUMENTS

| 569,663 | A | * | 10/1896 | Perkins .......................... 474/95 |
| 1,758,280 | A | * | 5/1930 | Evans ............................ 193/37 |
| 3,657,779 | A | | 4/1972 | Granberry |
| 3,775,821 | A | | 12/1973 | Somerville |
| 4,402,390 | A | | 9/1983 | Feeney |
| 4,473,221 | A | | 9/1984 | Arai |
| 5,117,970 | A | | 6/1992 | Gibbs |
| 5,224,252 | A | * | 7/1993 | Baker et al. .................... 492/38 |
| 5,735,516 | A | | 4/1998 | Gerlier et al. |
| 5,868,036 | A | * | 2/1999 | Salzman ........................ 74/450 |

(Continued)

FOREIGN PATENT DOCUMENTS

| EP | 0315754 A2 | 5/1989 |
| GB | 2132737 A | 7/1984 |

(Continued)

OTHER PUBLICATIONS

International Search Report (in English) and Written Opinion (in German) for PCT/EP2010/066815; mailed Feb. 25, 2011; ISA/EP.

(Continued)

*Primary Examiner* — Douglas Hess
(74) *Attorney, Agent, or Firm* — Harness, Dickey & Pierce, P.L.C.

(57) ABSTRACT

The invention relates to a device for handling notes of value, comprising at least one shaft (12) on which at least one transport element (16) for transporting the notes of value is arranged. The transport element (16) comprises a first segment (32a) and a second segment (32b) separated from the first segment (32a) in an unmounted state. In a mounted state the first segment (32a) and the second segment (32b) are firmly connected to each other and enclose the shaft (12).

20 Claims, 9 Drawing Sheets

(56) References Cited

U.S. PATENT DOCUMENTS

| | | | |
|---|---|---|---|
| 6,474,639 B1 * | 11/2002 | Borne et al. | 271/272 |
| 7,643,782 B2 * | 1/2010 | Ishii et al. | 399/302 |
| 7,950,518 B2 | 5/2011 | Fehrenbach et al. | |
| 8,327,614 B1 * | 12/2012 | Tegeler et al. | 59/4 |
| 8,459,308 B2 * | 6/2013 | Saito et al. | 138/166 |
| 8,474,602 B2 * | 7/2013 | Miller et al. | 198/779 |
| 2003/0094125 A1 | 5/2003 | Hsueh | |

FOREIGN PATENT DOCUMENTS

| | | |
|---|---|---|
| JP | 60061435 A | 4/1985 |
| JP | 6227700 A | 8/1994 |
| JP | 8012102 A | 1/1996 |
| JP | 2000128369 A | 5/2000 |
| JP | 2001302059 A | 10/2001 |
| JP | 2009184753 A | 8/2009 |
| JP | 2009249174 A | 10/2009 |
| WO | WO-2009018879 A1 | 2/2009 |

OTHER PUBLICATIONS

English Translation of International Preliminary Report on Patentability for PCT/EP2010/066815 (May 18, 2012).

* cited by examiner

DEVICE FOR HANDLING VALUE NOTES

CROSS-REFERENCE TO RELATED APPLICATIONS

This application is a National Stage of International Application No. PCT/EP2010/066815, filed Nov. 4, 2010, and published in German as WO 2011/054904 A1 on May 12, 2011. This application claims the benefit and priority of German Application No. 10 2009 052 040.6, filed Nov. 5, 2009. The entire disclosures of the above applications are incorporated herein by reference.

BACKGROUND

This section provides background information related to the present disclosure which is not necessarily prior art.

1. Technical Field

The invention relates to a device for handling notes of value, comprising at least one shaft on which at least one transport element for transporting notes of value is arranged.

2. Discussion

The shaft is in particular a shaft of a switch by means of which the notes of value can be rerouted. From Document WO 2009/018879 A1 such a switch is known. The switch known in this document comprises a shaft on which a multitude of switch wings is mounted in a rigid and stationary position. In alternative embodiments of such switches between each of two switch wings a transport roll is arranged through which the notes of value are guided while passing the switch. By using such transport rolls the distance between two consecutive transport rolls in transport direction of the notes of value is reduced, so that on the one hand smaller notes of value can be transported and on the other hand the security of the transport of the notes of value is increased. Such a switch shaft on which alternately switch wings and transport rolls are mounted necessitates an extensive mounting, as the switch wings and the transport rolls have to be slid on the shaft alternately in axial direction and have to be secured by means of additional elements against axial slipping. Such a mounting is time-consuming and causes high costs. Furthermore, a multitude of individual components have to be manufactured, in particular each switch wing has to be formed separately so that additional costs are caused. Moreover, it is disadvantageous that in such a construction the shaft cannot be mounted in the switch until all transport rolls and all switch wings have been mounted on it, what in particular can cause problems in case of limited spaces.

SUMMARY OF THE INVENTION

An object of the invention is to specify a device for handling notes of value in which at least one transport element can be mounted easily on a shaft of the device.

According to a first aspect of the invention the transport element comprises a first segment and a second segment separated from the first segment in an unmounted condition. When mounted the segments are connected to each other such that in a mounted state the first segment and the second segment are firmly connected to each other and the shaft is enclosed by the connected segments. By forming of the transport element of the two segments that can be connected to each other it is achieved that the transport element does not have to be slid on the shaft axially, but can be mounted radially. A radial mounting is in particular a fitting of the segments on the shaft, wherein the movement of the segments caused during mounting is directed in radial direction of the shaft. With a radial mounting possibility of the transport element it is achieved that the transport element can even be mounted on the shaft if the shaft has already been mounted in the device. In this way the mounting of the shaft is simplified again, as the shaft is much easier to handle without the transport elements mounted on it. Furthermore, by a radial mounting the transport element can for example be inserted in a circumferential groove of the shaft, so that the transport element is secured against axial slipping without requiring further mounting elements. With an axial mounting it is not possible to mount the transport element in such a groove.

Moreover, a radial mounting makes it possible to mount the transport element between elements already arranged on the shaft and firmly attached to it. In particular, by means of this the transport element can be arranged between two guiding fingers of a switch already situated on the shaft.

The simplified mounting described above reduces the assembly effort as well as the assembly costs. In addition, the space necessary for mounting the shaft itself is reduced so that all in all space can be saved.

In a preferred embodiment of the invention, in a mounted state the segments are connected to each other by means of at least one snap connection and/or at least one plug connection. Preferably, the segments are connected to each other by means of two snap connections and/or two plug connections, wherein each first end of the first segment is connected to a first end of the second segment by means of a first snap and/or plug connection, and a second end of the first segment is connected to a second end of the second segment by means of a second snap and/or plug connection. By connecting the segments by means of snap and/or plug connections it is achieved that the segments can be connected to each other easily without additional connecting elements, thus simplifying the mounting further. Moreover, such a snap and/or plug connection guarantees a secure connection of the segments in a mounted state.

In an alternative embodiment of the invention the segments can be connected to each other by means of at least two screws, wherein preferably the first end of the first segment is connected via a first screw to the first end of the second segment and the second end of the first segment is connected to the second end of the second segment via a second screw. By connecting the segments via screws it is achieved that the segments can be released any time non-destructively and can be connected to each other or be released from each other as often as desired. Furthermore, by such a screw connection it is achieved that the segments are firmly connected to each other and an unintentional release of the segments from each other is avoided.

Moreover, it is advantageous if the segments can be released from each other non-destructively. To achieve this when connecting the segments via a snap and/or plug connection the segments are formed elastically so that when the releasing the snap or plug connection they can be separated from each other non-destructively. In this way it is achieved that later after having been released from the shaft the segments can be mounted again. Thus, the segments can be reused what saves costs.

In addition, in a mounted state the segments can be connected to each other by at least one adhesive connection. In this way, an easy mounting and a secure connection of the segments are achieved. It is especially advantageous if the adhesive connection is formed by means of a two-component adhesive which enables a secure connection of the segments.

Moreover, alternatively the segments can be connected to each other at the same time via a snap connection, a plug connection, a screw connection and/or an adhesive connection. In particular, it can also be the case that the first ends of both segments are connected to each other by means of a different connection than both second ends of the segments.

In an especially preferred embodiment of the invention the first segment and the second segment are formed identically. Thus, it is achieved that only one segment form has to be manufactured, reducing the effort and the costs for a high quantity of pieces to be manufactured. In addition, errors during mounting are avoided as the segments cannot be confused with each other.

The transport element comprises in particular a transport roll and/or a transport roller by means of which during transport the notes of value are guided along a transport path. On the shaft mainly several transport rolls and/or transport rollers are arranged so that a secure guiding of the notes of value is guaranteed.

In particular, both segments have a ring segment shape so that by connecting both segments of ring segment shape a transport roller is formed. In this way, a transport roll can be mounted easily on the shaft.

In a preferred embodiment of the invention the segments each comprise a first and a second section, wherein the sections are directly adjacent to each other in axial direction of the segment. Here, the axial direction is the direction in which the axis of the shaft is directed, on which the segments are mounted. Both sections each include an angle of approximately 180°, preferably an angle of exactly 180°. Both sections are each arranged such that in peripheral direction of the segments they are displaced relatively to each other. The first section of each segment at each end of its outer surface has a recess, in particular a semi-cylindrical recess, and the second section has an engagement element complementary to each recess. In a mounted state the engagement element of the first segment engages in the recess of the second element, and the engagement element of the second segment engages in the recess of the first segments. In this way, both segments can easily be connected to each other securely by means of snap connection. Moreover, through this it is achieved that both segments are formed identically so that they cannot be confused with each other and only one segment type has to be manufactured.

The shaft can have at least one, preferably several, circumferential recesses, wherein the width of the recess corresponds to the width of the transport element or is slightly larger than the width of the transport element. At this point the shaft diameter corresponds approximately to the internal diameter of the transport element so that in a mounted state the transport element in axial direction of the shaft is prevented from an axial slipping on the shaft by means of the side walls of the recess, or respectively there is only a slight play through which the transport element can move axially. Hereby a stationary mounting of the transport element on the shaft can easily be achieved. Through this, in particular no more mounting elements are required. It is only possible to prevent an axial slipping of the transport element on the shaft in a pre-assembled recess of the shaft by means of the radial mounting made possible by the two-segment form of the transport element, whereas in an axial mounting a corresponding mounting is not possible.

The transport element is in particular independently pivot-mounted on the shaft, so that the transport elements during transport of the notes of value can be rotated accordingly by means of contact corresponding to the transport speed of the notes of value. For this, in particular the internal diameter of the transport element is formed larger that the diameter of the shaft at the point at which the transport element is arranged on the shaft. In alternative embodiments of the invention the transport element can also be arranged stationary on the shaft so that it rotates continuously at the same angle speed as the shaft. For this, in particular a transport element is used, the inner diameter of which is slightly smaller than the diameter of the shaft, so that in a mounted state the transport element is prevented from rotating relatively to the shaft by means of a tight fit.

The shaft is in particular the shaft of a switch with which the notes of value are rerouted from a first conveyor belt to a second conveyor belt. For this, the shaft comprises at least two guiding fingers that reroute the notes of value at a respective switch position. In a mounted state the transport element is arranged between the guiding fingers so that the notes of value during transport of the notes of value are guided along the switch through the transport element, thus preventing effectively a jam of the notes of value.

The guiding fingers are preferably injection-moulded on the shaft so that a time-consuming axial mounting the guiding fingers is not necessary. By this, in particular not each guiding finger has to be manufactured and mounted separately, but all guiding fingers of the shaft can be applied to the shaft in an injection moulding process. The radial mounting of the transport elements makes it possible to arrange the transport elements between the guiding fingers already injection moulded on the shaft.

In a preferred embodiment of the invention the center of rotation of the transport element does not lie on the axis of the shaft, but is located outside of this. Thus, it is achieved that the transport element can be adapted optimally to the transport path independent of the position of the shaft, so that the notes of value can be guided optimally by the transport element.

A second aspect of the invention relates to a device for handling notes of value, wherein the transport element comprises a first segment and a second segment, wherein a first end portion of the first segment and a first end portion of the second segment are connected to each other via a hinge, and wherein in an unmounted state a second end portion of the first segment opposite to the first end portion of the first segment, and a second end portion of the second segment opposite to the first end portion of the second segment are not engaged with each other, and in a mounted state the second end portion of the first segment and the second end portion of the second segment are connected firmly to each other, and the shaft is enclosed by the connected segments. In this way, again a radial mounting of the transport element on the shaft is easily made possible. In contrast to the first embodiment, however in an unmounted state the segments are not separated from each other, but the respective first end portions are connected to each other by means of the hinge. The hinge is in particular formed as integral hinge, so that both segments can be formed as one-piece. The connection between the second end portion of the first segment and the second end portion of the second segment can in particular be elaborated further as mentioned above. Thus, the connection between the second end portions can in particular be a snap connection, a plug connection, an adhesive connection and/or a screw connection. The form of the segments as well as the embodiment of the shaft can be developed further as specified.

BRIEF DESCRIPTION OF THE DRAWINGS

The drawings described herein are for illustrative purposes only of selected embodiments and not all possible implementations, and are not intended to limit the scope of the present disclosure.

Further features and advantages of the invention result from the following description which in connection with the enclosed Figures explains the invention in more detail with reference to embodiments

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
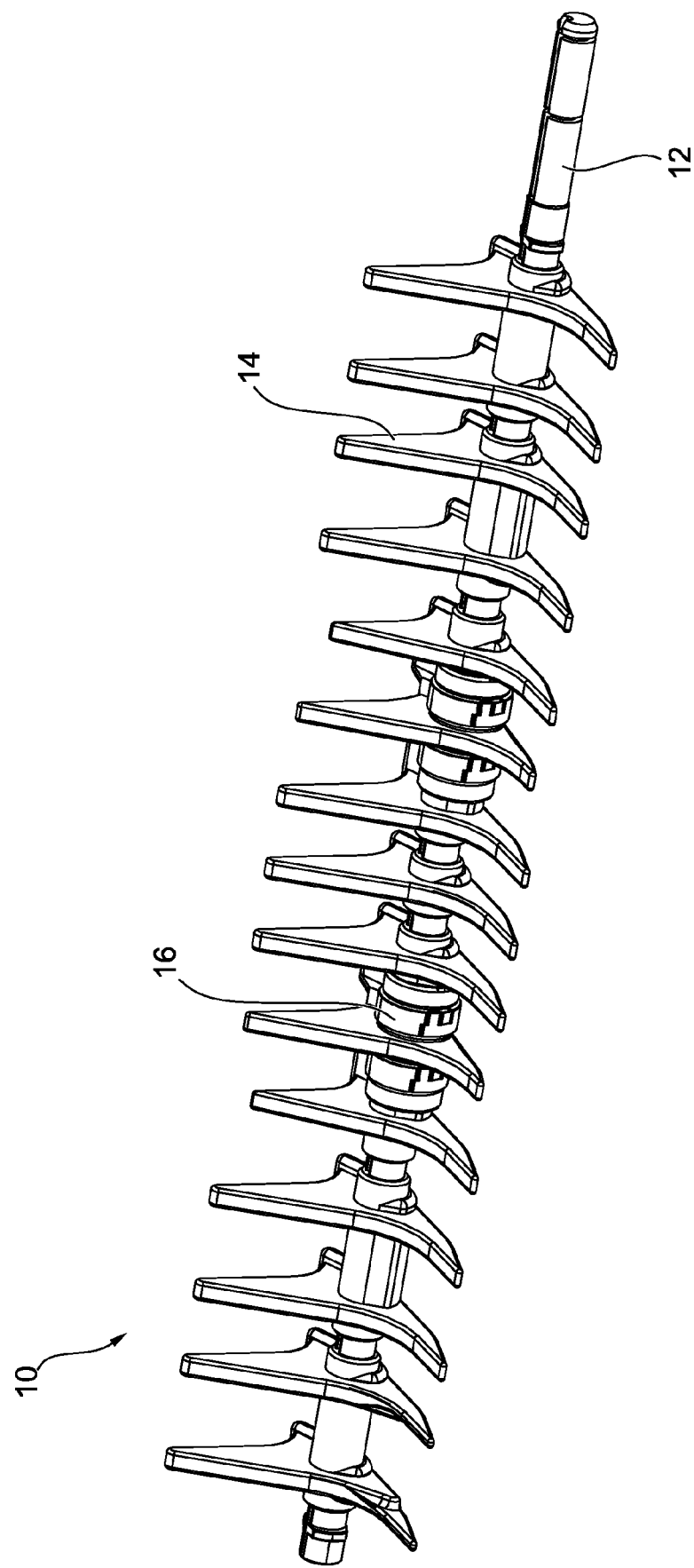
FIG. 1 is a schematic perspective illustration of a switch body with mounted transport rolls.

In FIG. 1 a schematic perspective illustration of a switch body 10 of a switch of a device for handling notes of value is shown. The device is in particular an automated teller machine, an automatic cash register system and/or an automated cash safe in which during deposit/withdrawal of notes of value these are transported along transport paths. The switch serves to reroute the notes of value from one transport path to another transport path according to its switch position.

The rerouting of the notes of value is hereby achieved by means of the switch body 10 that comprises a shaft 12 and a multitude of guiding fingers arranged on the shaft 12 and connected rotatably to this, with one of the guiding fingers exemplarily identified with the reference sign 14. The shaft 12 can be turned via an adjusting arrangement not-illustrated, in particular a stepper motor or a solenoid, between different switch positions, wherein when rotating the shaft 12 the guiding fingers 14 connected rotatably to the shaft are rotated as well, so that the notes of value are transported along the transport fingers 14 according to the switch position from one transport path to another transport path.

Furthermore, the switch body 10 comprises four transport rolls one of which is exemplarily identified with the reference sign 16. The transport rolls 16 serve to guide the notes of value during transport of the notes of value along the switch. At the ends of each transport path facing the switch transport elements are arranged for transport of the notes of value, in particular pair of rolls that guide the notes of value to the switch or away from the switch, respectively. By arranging the transport rolls 16 on the switch body 10 the distance between two adjacent transport elements of the transport paths is reduced so that smaller notes of value can be transported as well and the security of transport is increased, thus avoiding jams of notes of values. For this purpose the transport elements 16 are pivot-mounted on the switch body so that these can rotate along with the transport speed of the notes of value and can rotate in both directions according to the transport direction of the notes of value. The transport rolls 16 are each arranged between two adjacent guiding fingers 14.

Figure 2:
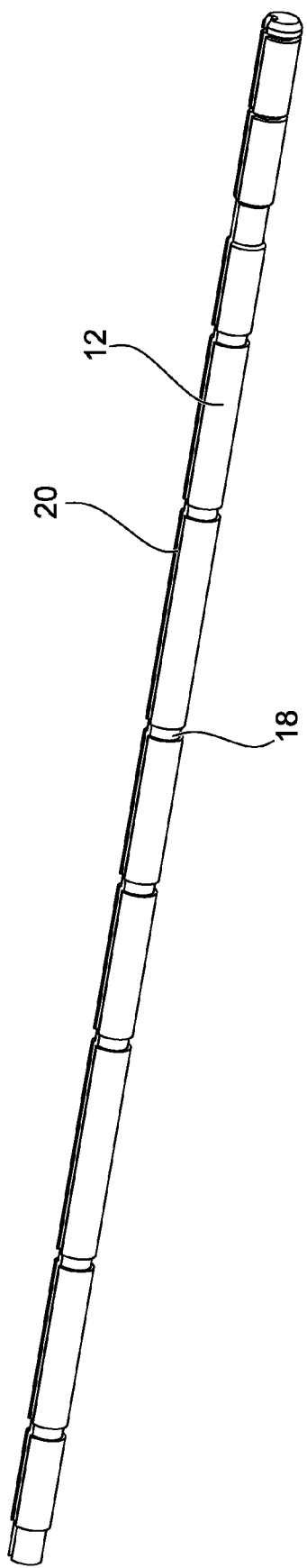
FIG. 2 is a schematic perspective illustration of a shaft of the switch body according to FIG. 1.

FIG. 2 illustrates a schematic perspective of the shaft 12 of the switch body 10. Elements having the same structure or the same function are identified with the same reference signs.

The shaft 12 comprises several circumferential recesses, one of which is exemplarily identified with reference sign 18, and a groove 20 running in axial direction of the shaft 12. For this reason the shaft 12 is also identified as profile shaft. The circumferential recesses 18 can each be designed identically or can have different dimensions. By means of the circumferential recesses 18 and the axial groove 20 a stationarily and rotatably connected arrangement of the guiding fingers 14 on the shaft 12 is achieved. For this purpose, in an injection moulding process the guiding fingers 14 are injection moulded directly on the shaft 12. During this the shaft 12 is completely inserted in the injection mould, and the guiding fingers 14 are injection moulded together.

Figure 3:
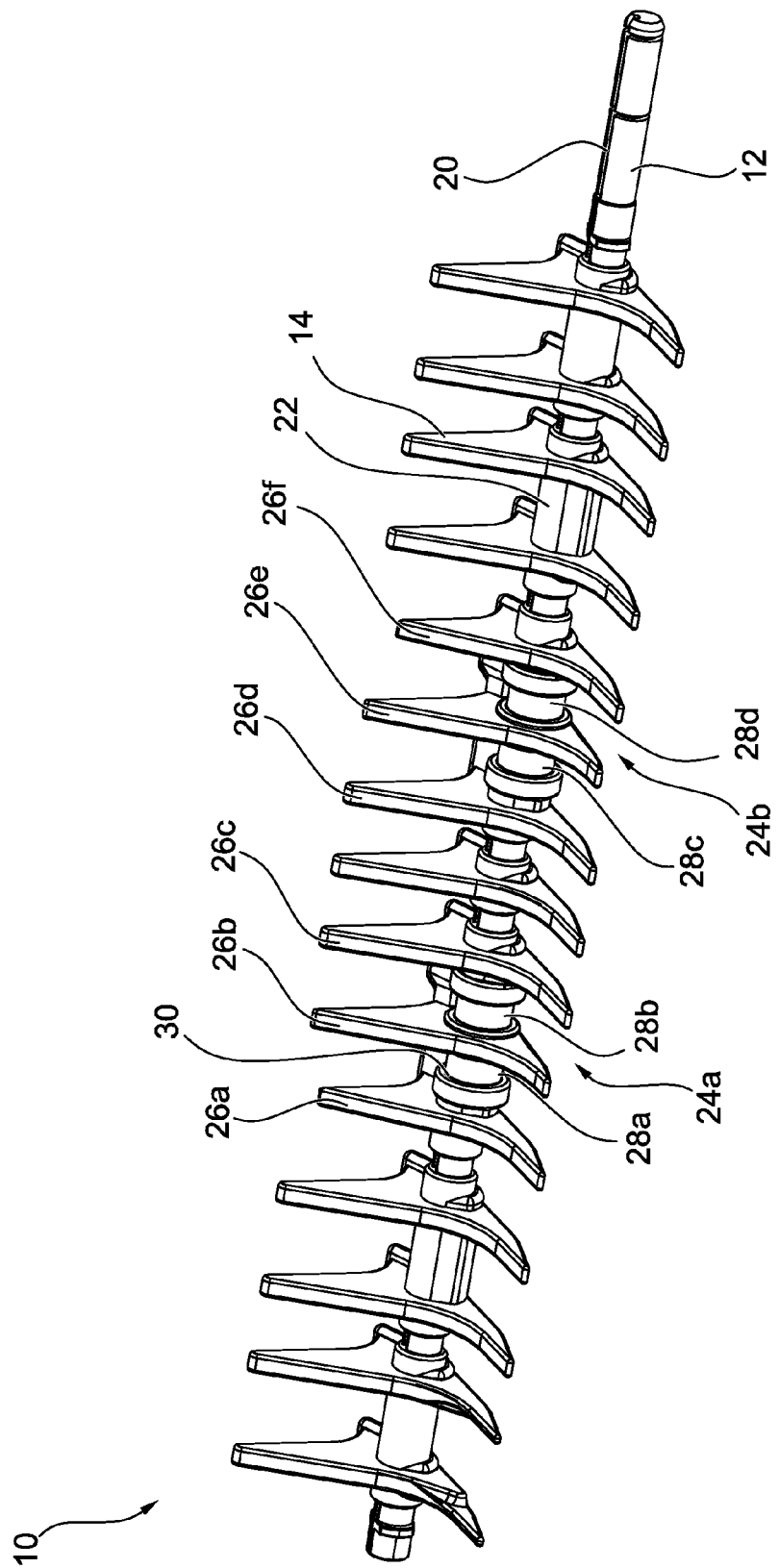
FIG. 3 is a schematic perspective illustration of the switch body according to FIG. 1 without transport roll.

FIG. 3 is a schematic perspective illustration of the switch body 10 after injection moulding the guiding fingers 14 on the shaft 12. In this case, not each guiding finger 14 is injection moulded on the shaft 12 individually, but two or three adjacent guiding fingers 14 are injection moulded together as an element on the shaft 12, wherein these two adjacent guiding fingers 14 are each connected to each other through a connecting element 22 running in axial direction of the shaft 12. Such a unit of connected guiding fingers 14 is also designated as guiding finger unit. For each guiding finger unit at least one circumferential recess 18 is provided. During injection moulding of the guiding fingers 14 on the shaft 12 the circumferential recesses 18 are filled out accordingly with injection moulding material, thus preventing a later axial slipping of the guiding fingers 14 or the guiding finger units, respectively. In the same way the groove 20 is filled with injection moulding material during injection moulding of the guiding fingers 14 on the respective positions at which the guiding fingers 14 are arranged, so that a distortion of the guiding fingers 14 or the guiding finger units, respectively, is avoided and to connect the guiding fingers 14 non-rotatably with the shaft 12. In alternative embodiments of the invention all guiding fingers 14 can be connected to each other. Alternatively, each guiding finger 14 can be injection moulded individually on the shaft 12 so that no guiding fingers 14 are connected via guiding elements 22. Equally, more than two or respectively three adjacent guiding fingers 14, can be connected to each other via a connecting element 22.

By injection moulding the guiding fingers 14 on the shaft 12 the mounting effort is reduced considerably in comparison to a separate production of the guiding fingers 14 and an axial mounting of the guiding fingers 14 on the shaft 12. In particular, the guiding fingers 14 do not have to be manufactured and mounted axially on the shaft 12 individually. Thus, effort, time and costs can be saved. Moreover, when injection moulding the guiding fingers 14 on the shaft 12 it is not necessary to prevent the guiding fingers 14 from axial slipping by means of additional elements, as is necessary in case with an axial mounting of the guiding fingers 14.

The switch body 10 comprises two guiding finger units 24a, 24b which each comprise three guiding fingers 24a to 24f. Between each two adjacent guiding fingers 26a to 26f of the respective guiding finger unit 24a, 24b a circumferential recess 28a to 28d is formed that serves to support the transport rolls 16. The recesses 28a to 28d are especially formed directly when the guiding fingers 14, 26a to 26f are injection moulded on the shaft 12. The diameter at the recess positions 28a to 28d is slightly smaller than the internal diameter of the transport rolls 16 so that the transport rolls 16 can rotate freely and thus are also driven via contact to the transported notes of value with the transport speed of the notes of value. The lateral walls of the recesses 28a to 28d prevent the transport rolls 16 from slipping in axial direction so that the transport rolls 16 are arranged stationarily on the shaft 12. One of these lateral walls is exemplarily illustrated with reference sign 30. The width of the transport rolls 16 corresponds approximately to the width of the recesses 28a to 28d.

In alternative embodiments of the invention it can also be the case that between each adjacent guiding fingers 26a to 26f there is no recess 28a to 28d, but that the distance between the adjacent guiding fingers 26a to 26f corresponds approximately to the width of the transport rolls 16 so that an axial slipping of the transport rolls 16 is prevented by means of the guiding fingers 26a to 26f.

As the guiding fingers 14, 26a to 26f are injection moulded firmly on the shaft 12 from the outset, the transport rolls 16 cannot be mounted to the shaft 12 axially as usual, but have to be mounted radially. Radial mounting means that the transport rolls 16 are mounted transverse to the direction of the axis of the shaft 12. For this purpose, the transport rolls each comprise two segments 32a, 32b, that are separated from each other in an unmounted state, and that are connected to each other in a mounted state and enclose the shaft 12 or the corresponding recesses 28a to 28d of the guiding finger units 24a, 24b.

Figure 4:
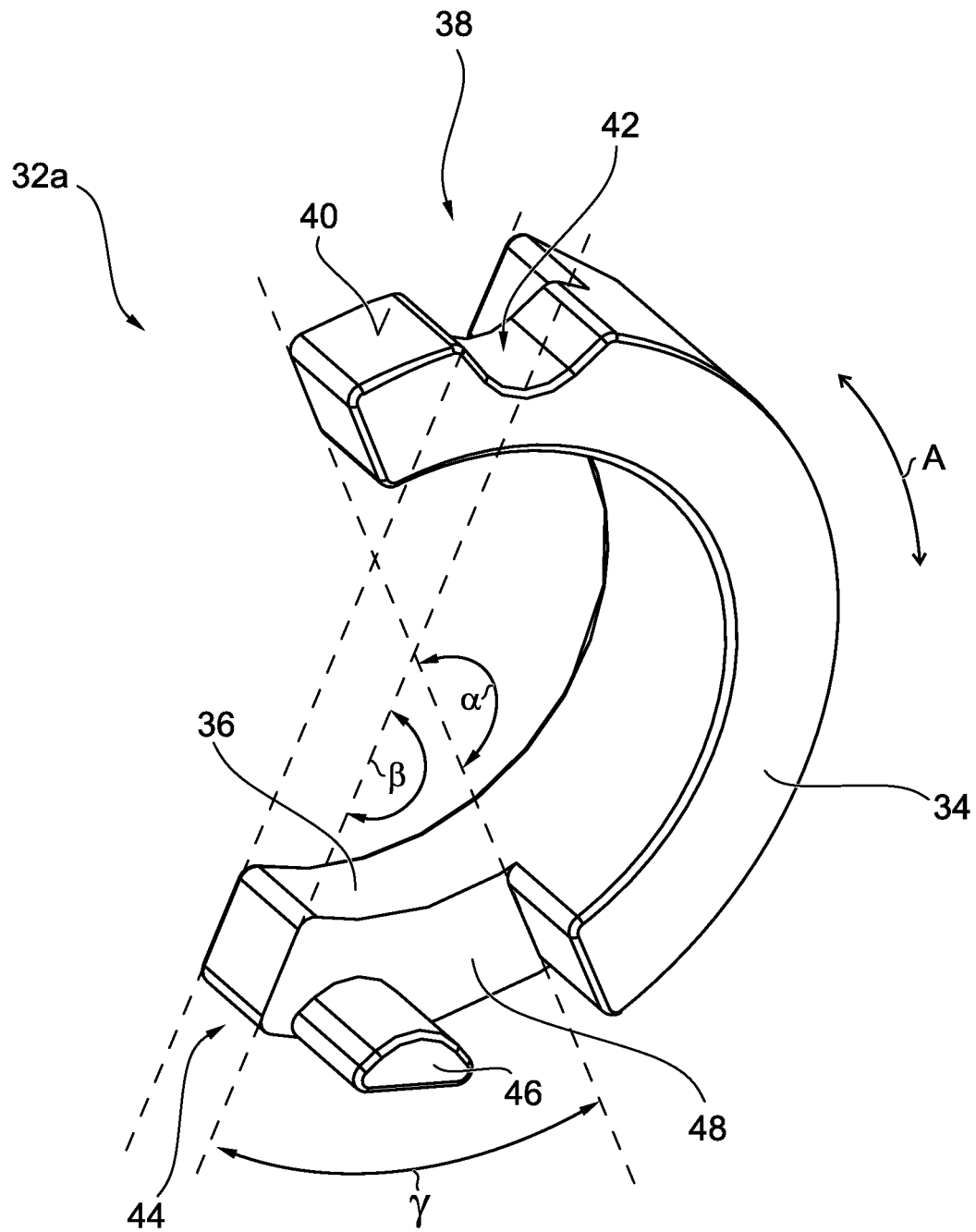
FIG. 4 is a schematic perspective illustration of a segment of a transport roll.
Figure 5:
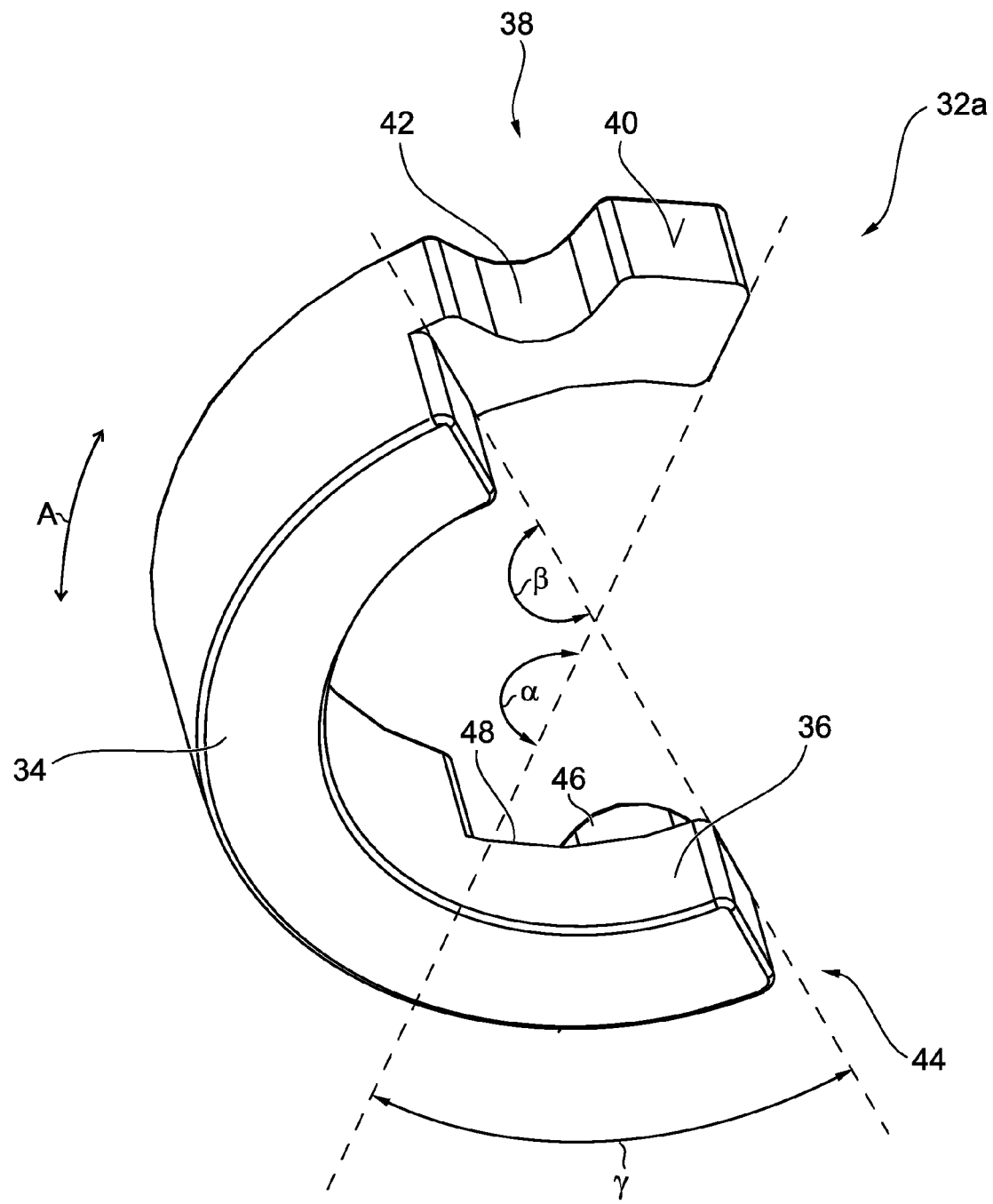
FIG. 5 is a further schematic perspective illustration of the segment according to FIG. 4.

FIGS. 4 and 5 each show a perspective schematic illustration of one of these segments 32a, 32b of the transport rolls 16. The segments 32a, 32b are in particular designed identically so that only one segment type has to be manufactured, thus reducing costs and avoiding the likelihood of confusion during mounting. Accordingly, in the following only the design of a segment 32a is illustrated in connection with the FIGS. 4 and 5. The corresponding second segment 32b of the transport roll 12 is formed identically. In alternative embodiments of the invention the two segments can be formed differently.

Segment 32a comprises two sections in form of ring segments 34, 36 that are immediately adjacent to each other in axial direction. The both sections 34, 36 are in particular formed as one-piece. The first section 34 as well as the second section 36 each include an angle α, β of 180°. Both sections 34, 36 itself are displaced relatively to each other in the direction of rotation A by an angle γ. The angle γ has in particular a value in a range between 20° and 60°, preferably between 40° and 50°. The flexibility of segments 32a, 32b, in particular of the end portions 38, 44 can be adjusted by the angular size of γ. The larger the angle γ, the larger is the flexibility and the easier segments 32a, 32b can be connected to each other and be separated from each other. The first section 34 has a recess 42 in an end region 38 on its surface area 40. The recess 42 is in particular formed such that it is continuous in axial direction.

The second section 36 has at one end region 44 an engagement element 46 formed complementary to the recess 42. The engagement element 46 is directed in axial direction and is arranged at side 48 of the second section 36 at which also the first section 34 is arranged displaced by the angle γ.

Figure 6:
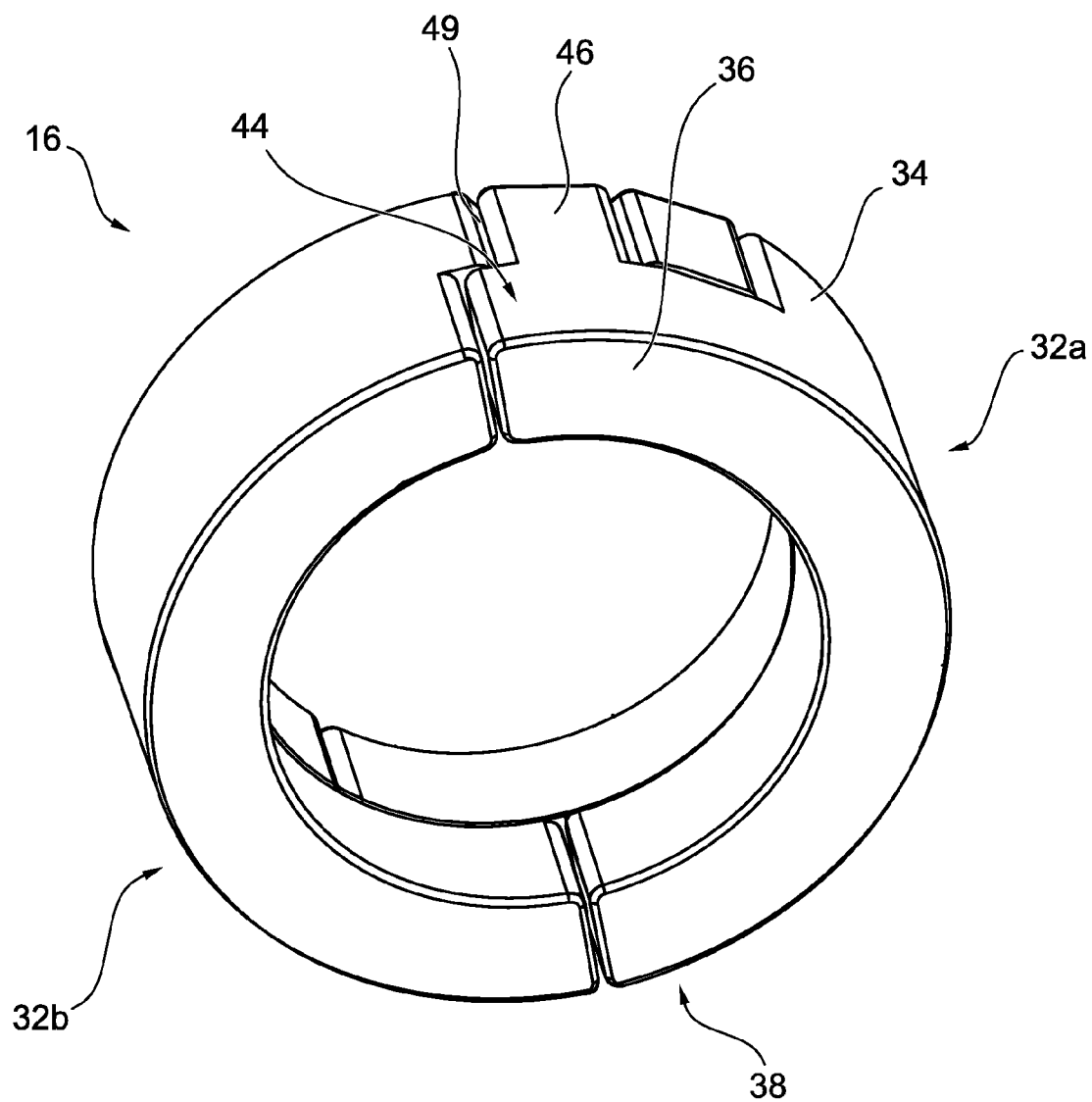
FIG. 6 is a schematic perspective illustration of a transport roll.

FIG. 6 shows a schematic perspective illustration of transport roll 16, wherein both segments 32a, 32b as shown in the mounted transport roll 16 in FIG. 6 are connected to each other. The shaft 12 and the guiding fingers 14, 26a to 26f are not illustrated in FIG. 6.

In a mounted state the engagement element 46 of the first segment 32a engages in a recess 49 of the second segment 32b, and a not-visible engagement element of the second segment 32b engages in the recess 42 of the first segment 32a. In this way a snap connection is formed between the first segment 32a and the second segment 32b by which segments 32a, 32b are firmly connected to each other. The segments 32a, 32b are connected by this snap connection such that during regular operation of the transport roll 16 an inadvertent release is prevented. However, in a preferred embodiment of the invention the segments 32a, 32b are formed elastically such that the snap connection can be released non-destructively so that after release and demounting of the shaft 12 the transport rolls 16 can be re-used again.

By way of the previously described concrete design of the snap connection between the segments 32a, 32b it is achieved that these segments can be mounted on each other by a simple radial movement. In case a movement in axial direction is not necessary so that the transport roll 16 in a minimum of space, especially if it is laterally enclosed directly by two guiding fingers 26a to 26f can be mounted.

The engagement elements 46 are flattened at the side directed in a mounted state to the direction of the recess 42, 49 of the other segment 32a, 32b, so that during assembly these can simply be guided over the surface area of the respective other segment until they engage in the recess 42, 49.

Figure 7:
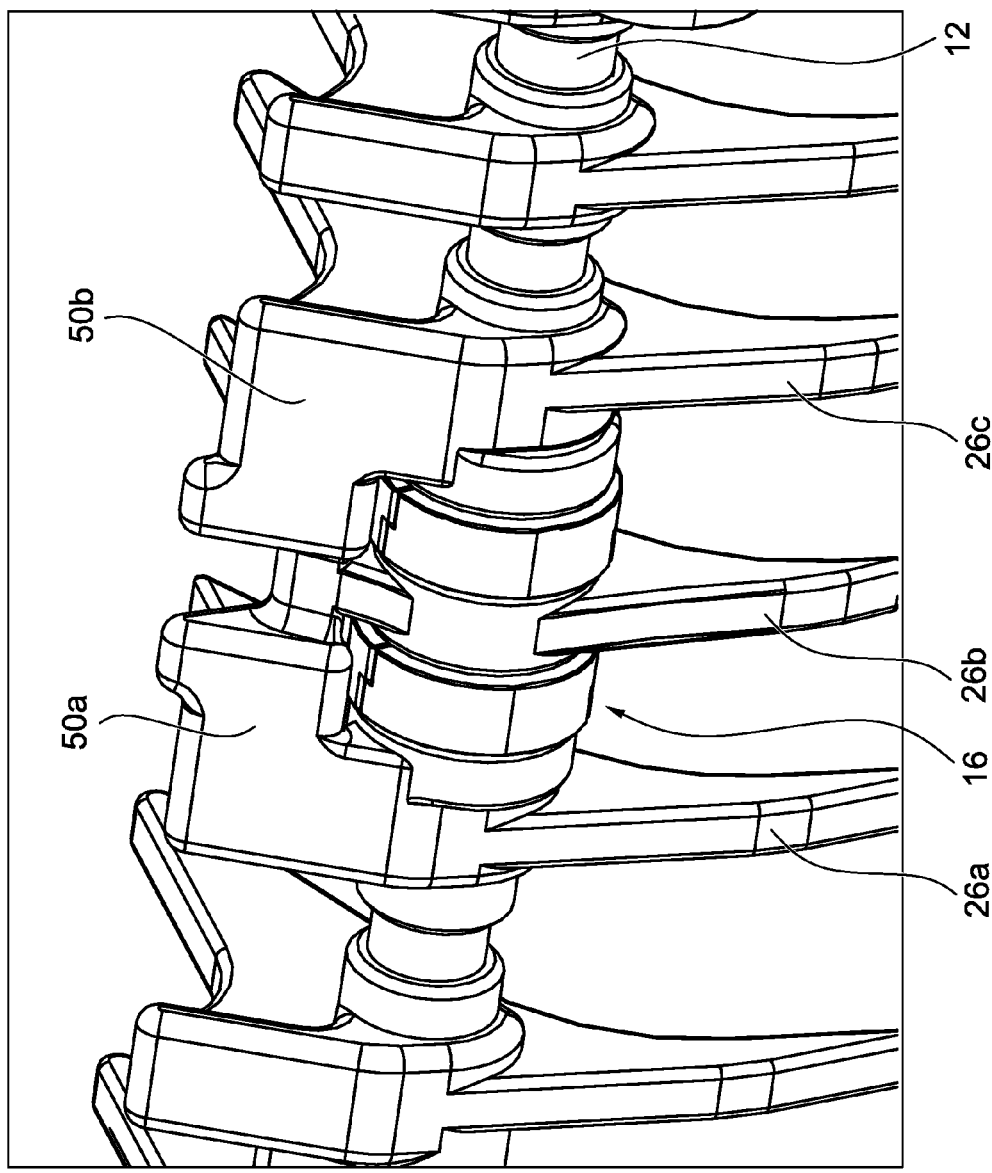
FIG. 7 is a schematic perspective illustration of a detail of the switch body shown in FIG. 1 and FIG. 3 together with transport rolls mounted on it.

In FIG. 7 a schematic perspective illustration of a section of the switch body 12 with transport rolls 16 mounted on it is shown. Due to the two-part design of the transport rolls 16 of two segments 32a, 32b the transport rolls 16 can be easily mounted radially via the simple-designed snap connection, even in case of projecting guiding elements 50a, 50b of the guiding fingers 26a to 26f.

Figure 8:
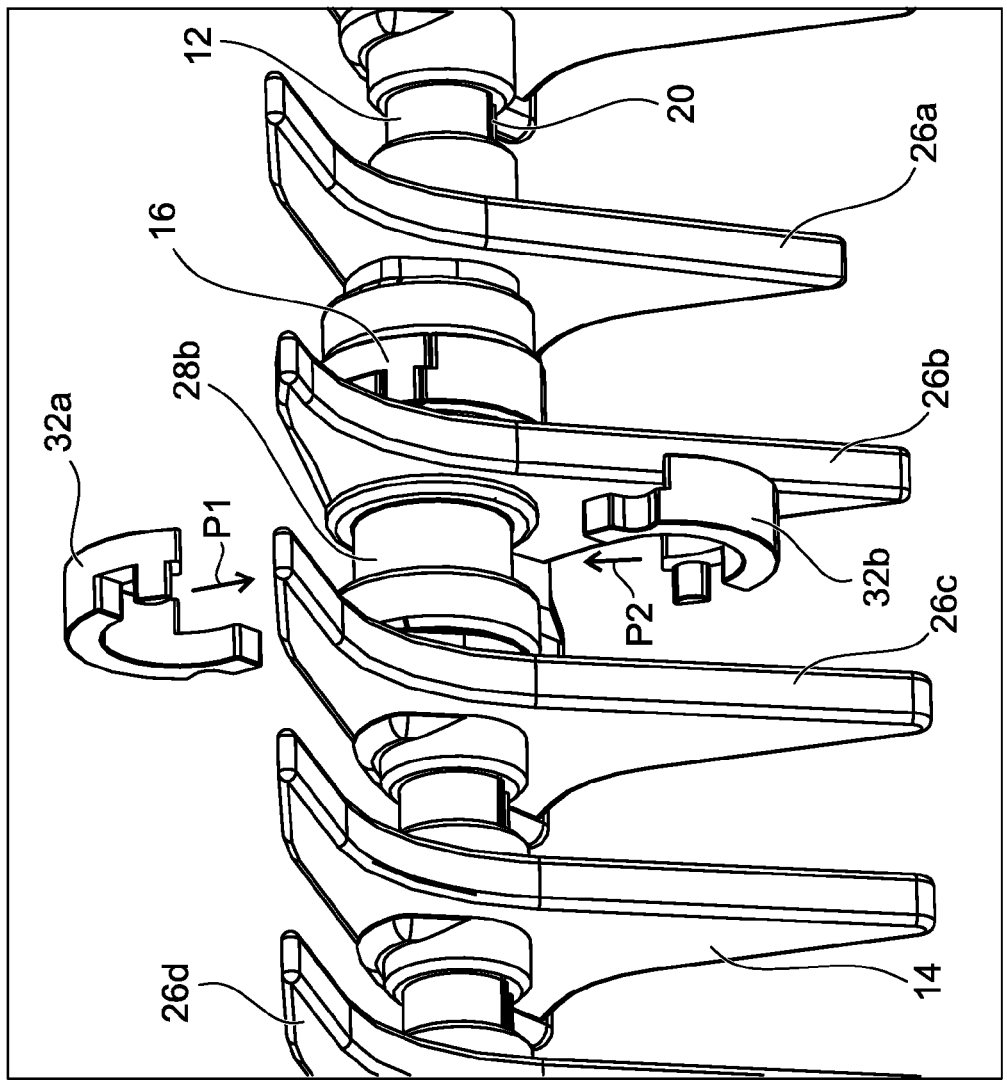
FIG. 8 is a schematic perspective illustration of a detail of the switch body according to FIGS. 1, 3 and 7 when mounting a transport roll.

In FIG. 8 a schematic perspective illustration of a section of the switch body 10 is shown, wherein the radial mounting of the transport roll 16 via a radial mounting of the segments 32a, 32b is illustrated. The segments 32a, 32b are moved towards each other via a linear movement directed in a radial direction and are mounted to the shaft 12 or the recess 28c, respectively. The radial direction in which the segments 32a, 32b are moved towards each other is indicated by the arrows P1 and P2. When mounting the transport roll 16 by means of connecting segments 32a, 32b a rotary motion is not necessary. In the same way, a movement of the segments 32a, 32b directed in axial direction is not necessary.

In regions of the recess 28a to 28d, thus in regions in which the transport rolls 16 are mounted, the guiding finger units 24a, 24b are designed such that the center of rotation of the transport rolls 16 does not lie on the axis of the shaft 12. In this way, it is achieved that the position of the transport rolls 16 can be adjusted optimally to the transport path of the notes of value. Such an eccentric mounting of the transport rolls 16 can be realized by a radial mounting possibility of the transport rolls 16, as the eccentrically formed recesses 28a to 28d can be injection moulded directly, and the transport rolls 16 can be mounted according to the position pre-determined by the recesses 28a to 28d.

Figure 9:
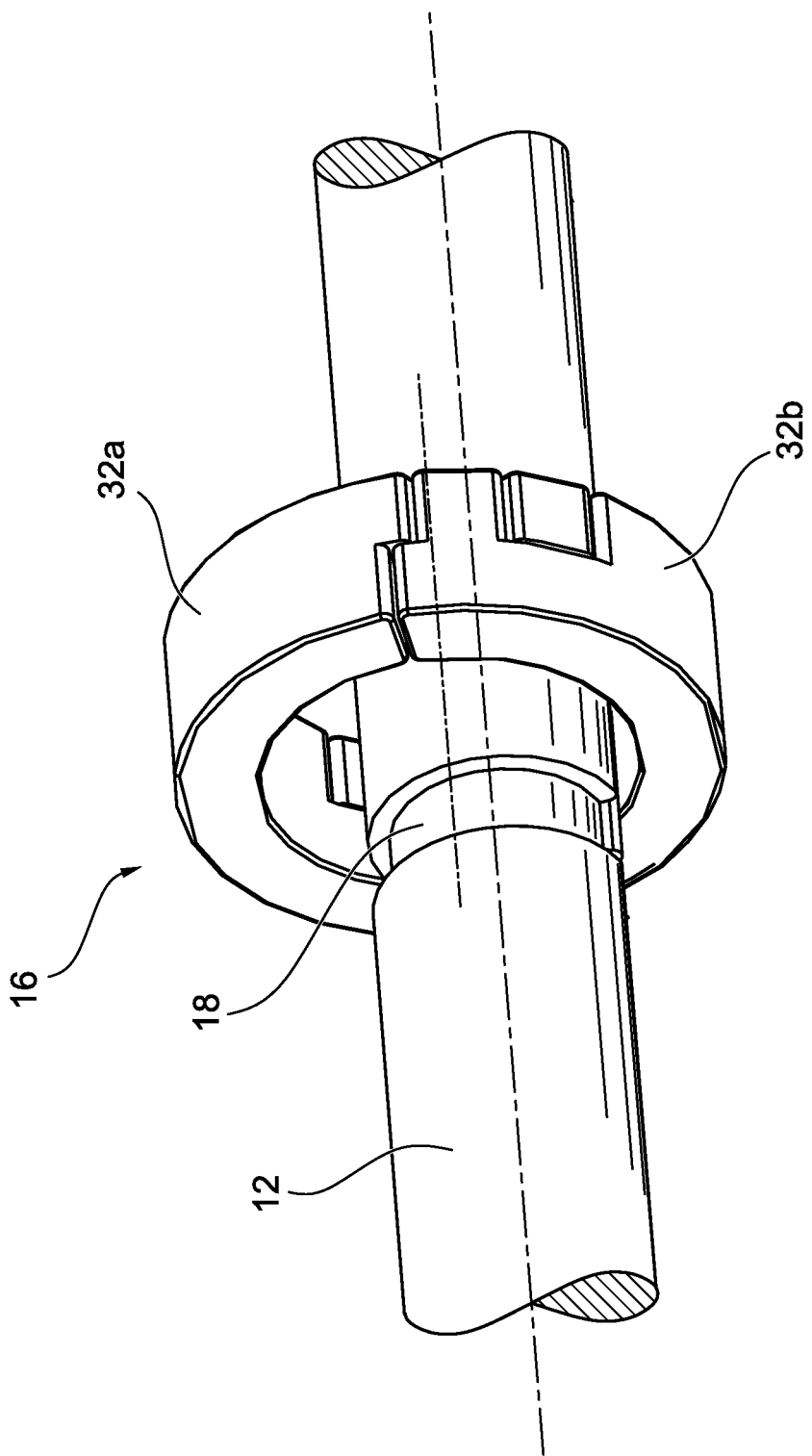
FIG. 9 is a schematic perspective illustration of a detail of the switch body.

In FIG. 9 a section of the switch body 10 is shown, wherein the switch finger units 24a, 24b are not shown so that the not-concentric position of the transport roll 16 to the shaft is clearly visible.

In an alternative embodiment of the invention the segments 32a, 32b can be connected to each other additionally or alternatively to the snap connection also via a plug connection, a screw connection and/or an adhesive connection. Moreover, the snap connection can also have a design deviating from the previously described design. In the same way, alternatively the both segments 32a, 32b can be designed differently, wherein the segments 32a, 32b are designed such that they can be mounted on each other.

In a further alternative embodiment of the invention one end of both segments can be connected to each other by means of a hinge so that the segments are also connected to each other in an unmounted state. During mounting, the segments connected to each other via the hinge are attached radially to the shaft and then are connected to each by pressing together the ends that are not connected via the hinge, so that the shaft 12 or the guiding finger units 24a, 24b are enclosed. These ends are in particular also connected to each other by means of a snap connection. Alternatively or additionally the ends can be connected to each other by means of a clamping connection, screw connection and/or adhesive connection.

Furthermore, the transport rolls 16 formed from two segments 32a, 32b can also be mounted on shafts that do not belong to a switch. In particular, the transport rolls 16 can be mounted directly on a shaft. This shaft can have recesses in peripheral direction but can also be designed without such recesses, i.e. it can be designed "smooth".

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A device for handling notes of value comprising:
   at least one shaft on which at least one transport element for transporting the notes of value is arranged, the transport element includes a first segment and a second segment separated in an unmounted state from the first segment, the first segment and the second segment each form half of a ring segment;
   wherein:
   in a mounted state the first segment and the second segment are firmly connected to each other by way of at least one snap connection, and the shaft is enclosed by the connected first and second segments;
   the first and the second segments each have a first section and a second section adjacent to the first section in an axial direction;
   the first section and the second section each include an angle of about 180°;
   the first section and the second section are displaced relative to one another in a peripheral direction;
   an end region of the first section of each of the first and second segments has a recess on a surface area thereof;
   each one of the first segment and the second segment respectively include an engagement element complementary to the recess; and
   in the mounted state the engagement element of the first segment engages with the recess of the second segment, the engagement element of the second segment engages with the recess of the first segment, and the engagement elements connect the first and the second segments to each other.

2. The device according to claim 1, wherein the first segment and the second segment can be connected to each other such that they can be mounted radially on the shaft.

3. The device according to claim 1, wherein the segments in the mounted state are connected to each other via at least one plug connection.

4. The device according to claim 1, wherein the segments in the mounted state are connected to each other via at least two screws.

5. The device according to claim 1, wherein the connection of the segments can be released non-destructively.

6. The device according to claim 1, wherein the segments in the mounted state are connected by means of an adhesive connection.

7. The device according to claim 1, wherein the first segment and the second segment are formed identically.

8. The device according to claim 1, wherein the transport element comprises a roll or a roller.

9. The device according to claim 1, wherein the shaft has at least one circumferential recess, wherein the width of the recess corresponds to the width of the transport element or is slightly larger than the width of the transport element, and that the shaft diameter at the point of the recess corresponds approximately to the inner diameter of the transport element in the mounted state.

10. The device according to claim 1, wherein the transport element is arranged rotatably on the shaft independently from the shaft.

11. The device according to claim 1, wherein the shaft is a shaft of a switch with the aid of which the notes of value can be rerouted, that the shaft comprises at least two guiding fingers for rerouting the notes of value and that the transport element in the mounted state is arranged between two guiding fingers.

12. The device according to claim 11, wherein the guiding fingers are injection moulded on the shaft.

13. A device for handling notes of value comprising:
   at least one shaft on which at least one transport element for transporting the notes of value is arranged, the transport element includes a first segment and a second segment each form half of a ring segment;
   wherein:
   a first end portion of the first segment and a first end portion of the second segment are configured to be connected via a hinge;
   in an unmounted state, a second end portion of the first segment opposite to the first end portion of the first segment, and a second end portion of the second segment opposite to the first end portion of the second segment, are not engaged with each other;
   in a mounted state, the second end portion of the first segment and the second end portion of the second segment are firmly connected to each other by way of at least one snap connection, and the shaft is enclosed by the connected first and second segments;
   the first and the second segments each have a first section and a second section adjacent to the first section in an axial direction;
   the first section and the second section each include an angle of about 180°;
   the first section and the second section are displaced relative to one another in a peripheral direction;
   an end region of the first section of each of the first and second segments has a recess on a surface area thereof;
   each one of the first segment and the second segment respectively include an engagement element complementary to the recess; and
   in the mounted state the engagement element of the first segment engages with the recess of the second segment, the engagement element of the second segment engages with the recess of the first segment, and the engagement elements connect the first and the second segments to each other.

14. A device for handling notes of value comprising:

a transport element configured to be clamped onto a shaft in a mounted configuration such that the shaft extends through an aperture defined by the transport element and a longitudinal axis of the shaft extends through an axial center of the aperture, the transport element including:
- a first segment having a first section and a second section on opposite sides of the first segment, each one of the first and second sections is semi-circular shaped and extends about 180°, the first and second sections are rotationally offset such that the first section extends beyond the second section at a first end of the first segment and the second section extends beyond the first section at a second end of the first segment, the first section defines a first recess proximate to the first end of the first segment, and the second section includes a first engagement element extending from a side thereof proximate to the second end of the first segment;
- a second segment having a first section and a second section on opposite sides of the second segment, each one of the first and the second sections is semi-circular shaped and extends about 180°, the first and second sections are rotationally offset such that the first section extends beyond the second section at a first end of the second segment and the second section extends beyond the first section at a second end of the second segment, the first section defines a second recess proximate to the first end of the second segment, and the second section includes a second engagement element extending from a side thereof proximate to the second end of the second segment;

wherein:
- in an unmounted configuration the first segment is decoupled from the second segment; and
- in the mounted configuration the first engagement element is seated within the second recess and the second engagement element is seated within the first recess to couple the first segment and the second segment together with a snap connection and define the aperture.

15. The device of claim 14, wherein the first and the second engagement elements extend generally parallel to the longitudinal axis of the shaft when the transport element is coupled to the shaft in the mounted configuration.

16. The device of claim 14, wherein the first and the second segments are identical.

17. The device of claim 14, wherein the first segment is a first half of the transport element and the second segment is a second half of the transport element.

18. The device of claim 14, wherein the first and second sections of each of the first and second segments are rotationally offset by 20° to 60°.

19. The device of claim 14, wherein the first and second sections of each of the first and second segments are rotationally offset by 40° to 50°.

20. The device of claim 14, wherein the shaft is included with a switch, with the aid of which the notes of value can be routed, the shaft includes at least two guiding fingers for rerouting the notes of value, and the transport element in the mounted configuration is arranged between adjacent ones of the at least two guiding fingers.

* * * * *